(12) United States Patent
Garg et al.

(10) Patent No.: US 12,417,687 B2
(45) Date of Patent: *Sep. 16, 2025

(54) AUTOMATIC PRESENCE SIMULATOR FOR SECURITY SYSTEMS

(71) Applicant: Comcast Cable Communications, LLC, Philadelphia, PA (US)

(72) Inventors: Amit Garg, Delran, NJ (US); Richard Woundy, North Reading, MA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,525

(22) Filed: Oct. 5, 2023

(65) Prior Publication Data

US 2024/0105037 A1  Mar. 28, 2024

Related U.S. Application Data

(63) Continuation of application No. 17/541,711, filed on Dec. 3, 2021, now Pat. No. 11,816,968, which is a
(Continued)

(51) Int. Cl.
  *G08B 15/00* (2006.01)
  *G05B 15/02* (2006.01)
(Continued)

(52) U.S. Cl.
  CPC .......... *G08B 15/002* (2013.01); *G05B 15/02* (2013.01); *G06F 3/16* (2013.01); *G06F 3/165* (2013.01); *H04R 27/00* (2013.01); *H04R 29/00* (2013.01); *G05B 2219/2642* (2013.01); *G08B 25/14* (2013.01); *H04R 2227/003* (2013.01); *H04R 2430/01* (2013.01)

(58) Field of Classification Search
  CPC ...... G08B 15/002; G08B 25/14; G05B 15/02; G05B 2219/2642; G06F 3/16; G06F 3/165; H04R 27/00; H04R 29/00; H04R 2227/003; H04R 2430/01
  See application file for complete search history.

(56) References Cited

U.S. PATENT DOCUMENTS

| 4,970,489 A | 11/1990 | Jenkins et al. |
| 5,252,947 A | 10/1993 | Marciano |

(Continued)

FOREIGN PATENT DOCUMENTS

| CN | 2539353 Y | 3/2003 |
| CN | 101001274 A | 7/2007 |

(Continued)

*Primary Examiner* — Daryl C Pope
(74) *Attorney, Agent, or Firm* — Banner & Witcoff, Ltd.

(57) ABSTRACT

Methods, systems and computing devices are described herein for monitoring a premises when residents or other users are present in order to detect patterns of activity at the premises. Such patterns may comprise, for example, a typical schedule indicating usage of one or more devices by one or more users of the premises. When a user is away or otherwise inactive, commands may be sent to various user devices to make it appear (e.g., to those outside the premises) as if the user is present by simulating and/or recreating the patterns that were previously detected.

17 Claims, 11 Drawing Sheets

Related U.S. Application Data continuation of application No. 16/522,841, filed on Jul. 26, 2019, now Pat. No. 11,222,516, which is a continuation of application No. 15/707,407, filed on Sep. 18, 2017, now Pat. No. 10,410,492.

(51) Int. Cl.

| | | |
|---|---|---|
| *G06F 3/16* | | (2006.01) |
| *G08B 25/14* | | (2006.01) |
| *H04R 27/00* | | (2006.01) |
| *H04R 29/00* | | (2006.01) |

(56) References Cited

U.S. PATENT DOCUMENTS

| | | | |
|---|---|---|---|
| 5,307,763 A | 5/1994 | Arthur et al. | |
| 5,400,246 A | 3/1995 | Wilson et al. | |
| 5,778,077 A | 7/1998 | Davidson | |
| 6,796,799 B1 | 9/2004 | Yoshiike et al. | |
| 6,885,305 B2 | 4/2005 | Davis | |
| 7,046,985 B2 | 5/2006 | Seales et al. | |
| 7,719,435 B2 | 5/2010 | Readler et al. | |
| 11,222,516 B2 | 1/2022 | Garg et al. | |
| 11,816,968 B2 * | 11/2023 | Garg | H04R 29/00 |
| 2001/0052862 A1 * | 12/2001 | Roelofs | H04N 21/234 |
| | | | 340/999 |
| 2007/0182543 A1 | 8/2007 | Luo | |
| 2008/0117485 A1 | 5/2008 | Cyprus | |
| 2008/0309509 A1 * | 12/2008 | Ortiz | G08B 15/002 |
| | | | 340/691.2 |
| 2010/0321151 A1 | 12/2010 | Matsuura et al. | |
| 2011/0006896 A1 | 1/2011 | Barnett et al. | |
| 2012/0265717 A1 | 10/2012 | Narayanan et al. | |
| 2015/0163412 A1 | 6/2015 | Holley et al. | |
| 2016/0163169 A1 | 6/2016 | Gerdes | |
| 2016/0189527 A1 * | 6/2016 | Peterson | G08B 31/00 |
| | | | 340/541 |
| 2016/0189532 A1 | 6/2016 | Malhotra et al. | |
| 2020/0394885 A1 | 12/2020 | Nguyen et al. | |

FOREIGN PATENT DOCUMENTS

| | | |
|---|---|---|
| CN | 102117062 A | 7/2011 |
| CN | 202306277 U | 7/2012 |
| CN | 103617687 A | 3/2014 |
| CN | 103618654 A | 3/2014 |
| CN | 204345487 U | 5/2015 |
| CN | 204786141 U | 11/2015 |
| JP | H08214233 A | 8/1996 |
| JP | 2005141478 A | 6/2005 |
| WO | 2001076290 A2 | 10/2001 |

* cited by examiner

A user controls devices in a premises

Premises Controller simulates a user's presence when the user is away

AUTOMATIC PRESENCE SIMULATOR FOR SECURITY SYSTEMS

RELATED APPLICATIONS

This application is a continuation of U.S. application Ser. No. 17/541,711 filed Dec. 3, 2021, which is a continuation of U.S. application Ser. No. 16/522,841 (now U.S. Pat. No. 11,222,516) filed Jul. 26, 2019, which is a continuation of U.S. application Ser. No. 15/707,407 (now U.S. Pat. No. 10,410,492) filed Sep. 18, 2017, which are entirely incorporated herein by references.

BACKGROUND

In providing security services, security systems typically include sensors for detecting break-ins. Such sensors may detect intrusions via windows and doors while a user is away or while the security system is otherwise armed. However, there remains an ever-present need for improvements in security systems' ability to detect, and hopefully prevent, unwanted intrusions.

SUMMARY

The following presents a simplified summary in order to provide a basic understanding of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Methods, systems and computing devices are described herein for monitoring a premises when residents or other users are present in order to detect patterns of activity at the premises. The patterns may be detected from recorded audio events indicating, for example, the sounds of television programs being viewed, the turning on/off of electronic devices, use of appliances, etc. Such patterns may comprise, for example, a typical schedule indicating usage of one or more devices by one or more users of the premises. When a user is away or otherwise inactive, commands may be sent to various user devices to make it appear (e.g., to those outside the premises) as if the user is present by simulating and/or recreating the patterns that were previously detected.

The methods, systems and computing devices described herein may be included as part of a network, such as a cable television distribution network.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
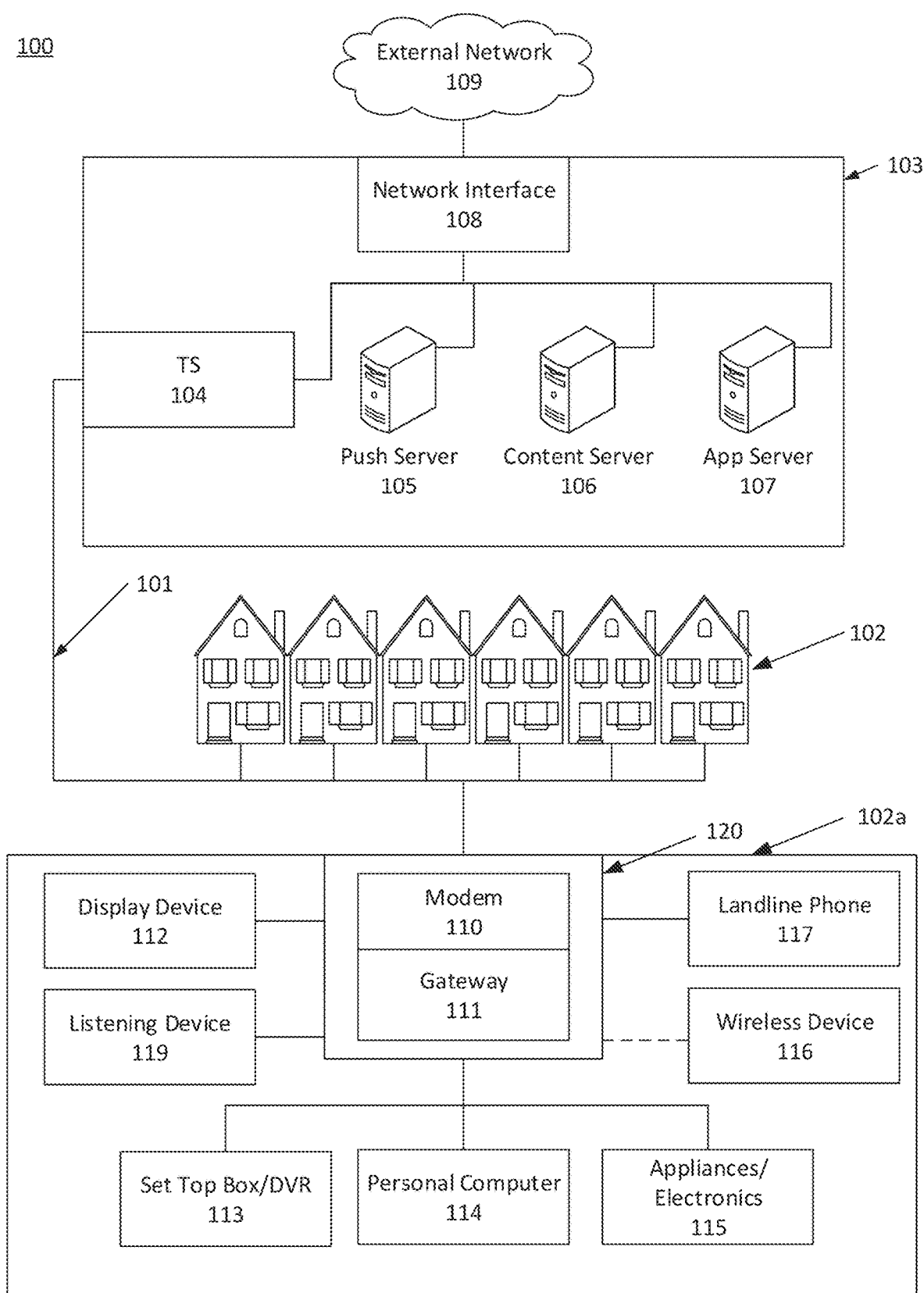
FIG. 1 shows an example network on which the various elements described herein may be implemented.

FIG. 1 shows an example network 100 on which many of the various features described herein may be implemented. The network 100 may be any type of information distribution network, such as satellite, telephone, cellular, wireless, optical fiber network, coaxial cable network, and/or a hybrid fiber/coax (HFC) distribution network. Additionally, the network 100 may be a combination of networks. The network 100 may use a series of interconnected communication links 101 (e.g., coaxial cables, optical fibers, wireless, etc.) and/or some other network (e.g., the Internet, a PSTN, etc.) to connect an end-point to a local office or headend 103. Example end-points are shown in FIG. 1 as a premises 102 (e.g., businesses, homes, consumer dwellings, etc.) The local office 103 (e.g., a data processing and/or distribution facility) may transmit information signals onto the links 101, and each premises 102 may have a receiver used to receive and process those signals.

There may be one link 101 originating from the local office 103, and it may be split a number of times to distribute the signal to various homes 102 in the vicinity (which may be many miles) of the local office 103. The links 101 may include components not shown, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS) in a HFC network, a DSLAM in a DSL network, a cellular base station in a cellular network, or some other computing device configured to manage communications between devices on the network of links 101 and backend devices such as servers 105-107 (which may be physical servers and/or virtual servers, for example, in a cloud environment). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. The servers may be physical servers and/or virtual servers. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.). In some examples, an application server may implement a network controller 303, as further described with respect to FIG. 3 below.

An example premises 102a may include an interface 120. The interface 120 may comprise a modem 110, which may include transmitters and receivers used to communicate on the links 101 and with the local office 103. The modem 110 may be, for example, a coaxial cable modem (for coaxial cable links 101), a fiber interface node (for fiber optic links 101), or any other desired device offering similar functionality. The interface 120 may also comprise a gateway interface device 111 or gateway. The modem 110 may be connected to, or be a part of, the gateway interface device 111. The gateway interface device 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), a landline phone 117, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), BLUETOOTH® interfaces (including, for example, BLUETOOTH® LE), ZIGBEE®, and others. The premises 102a may further include one or more listening devices 119, the operation of which will be further described below.

Figure 2:
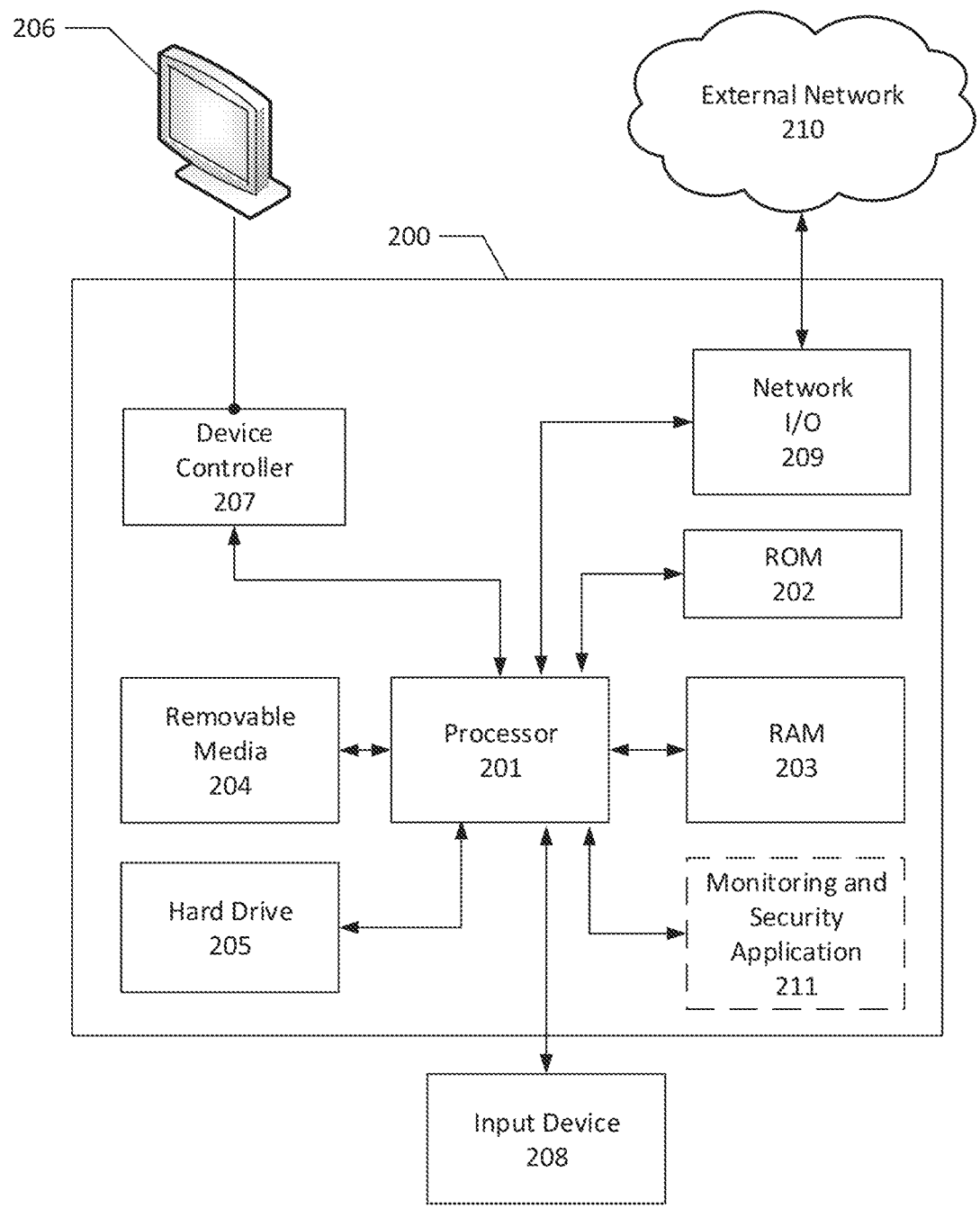
FIG. 2 shows an example computing device on which the various elements described herein may be implemented.

FIG. 2 shows an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. The interface 209 may include a modem (e.g., a cable modem), and the network 210 may include the communication links and/or networks shown in FIG. 1, or any other desired network.

The computing device 200 may include a monitoring and security application 211 that implements one or more security or monitoring features of the present description. The monitoring and security application 211 will be further described below with respect to FIGS. 3 and 4.

The FIG. 2 example is an exemplary hardware configuration. Modifications may be made to add, remove, combine, divide, etc. components as desired. Additionally, the components shown may be implemented using basic computing devices and components, and the same components (e.g., the processor 201, storage 202, user interface, etc.) may be used to implement any of the other computing devices and components described herein.

Figure 3:
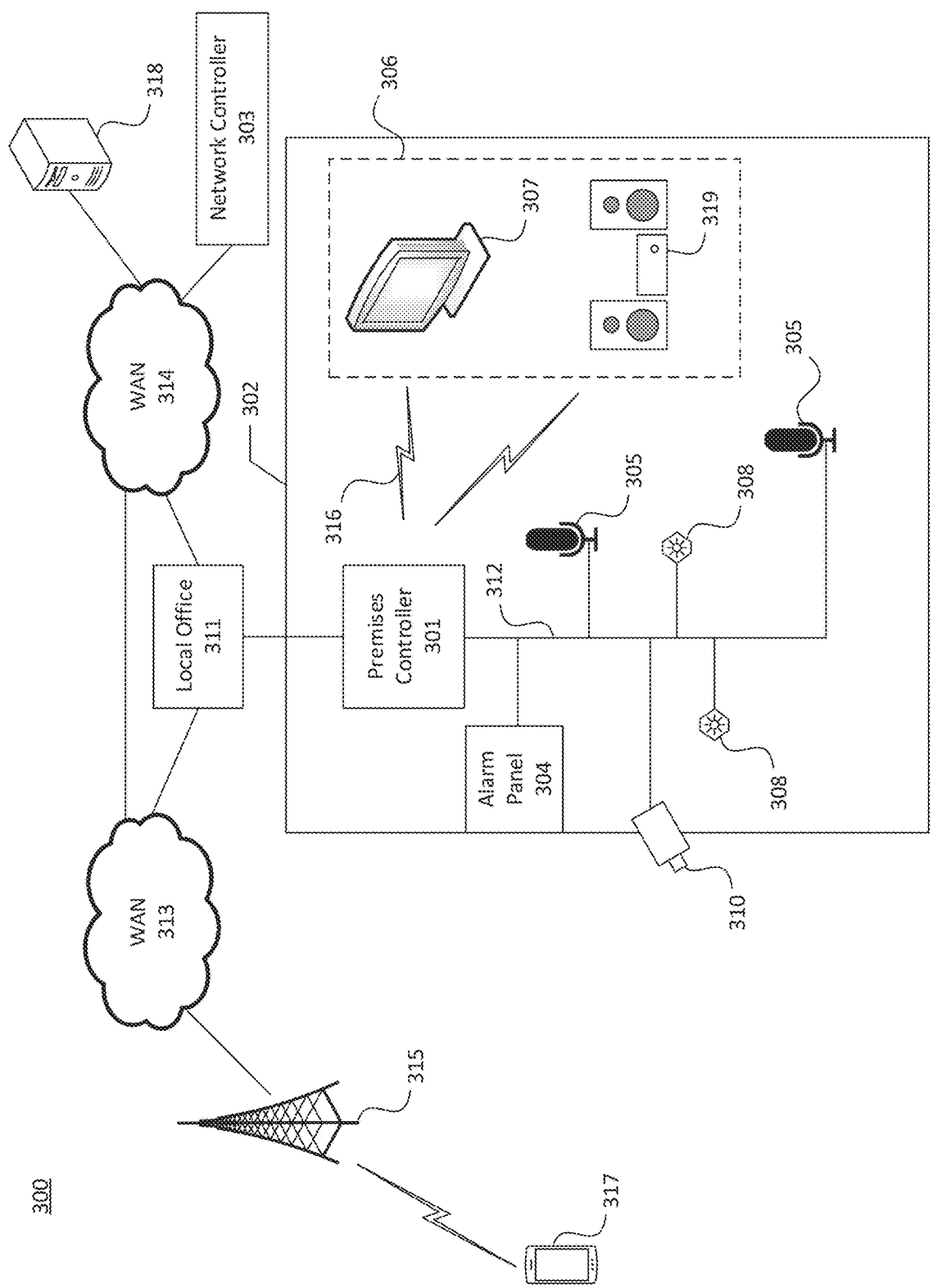
FIG. 3 shows an example monitoring and security system within a premises.

FIG. 3 shows an example monitoring and security system 300 for implementing features described herein. A premises may include a premises controller 301. The premises controller 301 monitors the premises 302 and simulates the presence of a user or resident of the premises 302. The premises controller 301 may monitor recorded audio signals in order to detect audio patterns of normal activities at the premises. The detected patterns may comprise, for example, indications of one or more habits of residents of the premises, for example, that a resident usually watches television in the afternoons, sometimes listens to music in the evenings, and/or other habits indicating usage patterns of media devices. When the resident is away, the premises controller 301 may command devices of the premises 302 to simulate the user's presence. For example, the premises controller 301 may turn on the television in the afternoon and turn on music in the evening to create the appearance that a resident is at home.

The premises controller 301 located in the premises 302 connects to a local office 311, which in turn connects via the WAN 314 to the network controller 303. The premises 302 further contains a plurality of listening devices 305 (e.g., devices that include one or more microphones) and/or video cameras 310 for monitoring the premises 302. An alarm panel 304 connects to the premises controller 301. Additionally, the premises controller 301 may control user entertainment devices 306, including a television 307 and a stereo 319 via transmission(s) 316. The premises controller 301 may also include home automation functions enabling communication with and control of lights 308 and other such devices. Various devices such as the alarm panel 304, the listening devices 305, lights 308, and a video camera 310 may be connected to the premises controller 301 via a local network 312.

The listening devices 305 may be scattered throughout the premises 302. For example, one or more listening devices 305 may be located in each room, or in select rooms, of the premises 302. Each listening device 305 may include one or more microphones for receiving/recording audio signals. The listening devices 305 may periodically transmit the received audio signals to the premises controller 301 for purposes of monitoring the premises 302. The premises controller 301 may analyze and process the monitored audio signals independently or in conjunction with the network controller 303. The listening devices 305 may send audio signals to the premises controller 301 using dedicated wires, via local network 312, or in any other manner. A listening device 305 may be integrated with another device, such as an alarm panel 304.

The alarm panel 304 may control security settings of the monitoring and security system 300. For example, a user may change an arming mode of the monitoring and security system 300 via the alarm panel 304 in order to enable or disable certain security features. Arming modes may include an "away" mode, a "night" mode, and/or a "stay" mode, among others. The premises controller 301 may check the modes set at the alarm panel 304 in order to determine a mode of the premises controller 301. When a mode indicates a user is present, the premises controller 301 may monitor the premises 302 to detect patterns of normal activity and behavior. When a mode indicates a user is away, the premises controller 301 may simulate the user's presence at the premises.

A portable communication device 317 (e.g., a smartphone) and/or a personal computer 318 may connect to the premises 302 via the WAN 313 (in conjunction with cellular network 315) and/or the WAN 314. The portable communication device 317 and/or the personal computer 318 may communicate with the network controller 303, which may in turn relay communications to and from the premises controller 301. Such communications may include requesting information from the security system, modifying a setting, or the like. For example, a resident could modify a user profile generated by the premises controller 301 in order to determine what actions the premises controller 301 takes in the user's absence from the premises 302.

Additionally or alternatively, the portable communication device 317 and/or the personal computer 318 may communicate with the premises controller 301 without the involvement of the network controller 303. The network controller 303 may perform the functions ascribed herein to the premises controller 301 instead of or in addition to the premises controller 301. The network controller 303 may be integrated with the local office 311 (e.g., as an application server 107 as shown by FIG. 1). Accordingly, an application server 107 embodying the network controller 303 may perform any of the techniques described herein.

The premises controller 301 may be implemented as a hardware or software component of the computing device 200 (e.g., as a monitoring and security application 211). Additionally or alternatively, the premises controller 301 may be implemented as a standalone device.

Figure 4A:
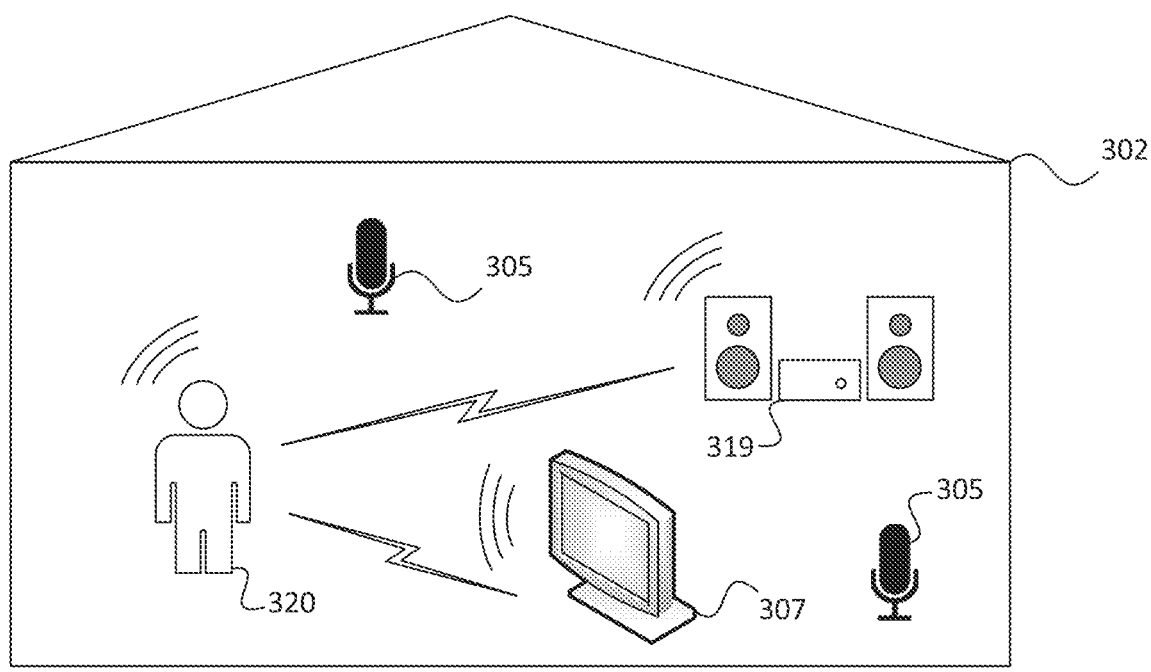
FIGS. 4A-B show an example monitoring and security system operating in different modes.

FIG. 4A shows the monitoring and security system operating in a first mode in which a user 320 is at the premises 302 (e.g., a stay mode). The user 320 may interact with one or more user entertainment devices 306, such as the television 307 and the stereo 319 (e.g., using remote controls or other user interfaces). The user entertainment devices 306 may generate sound. Additionally, the user 320 may generate sound, for example, by speaking. The listening devices 305 may record the sounds generated in the premises 302 and send the recorded audio signals to the premises controller 301 for analysis.

The premises controller 301 may analyze each audio signal to determine or estimate meta information about the audio contained in the signal, such as a volume of the audio signal, a classification of the audio signal (e.g., speech, music, etc.), and/or a device or person which may have generated the audio signal. The recorded audio signal together with the meta information may be stored as an event in an event log. The premises controller 301 may further analyze the event log to determine information about patterns of activity.

The premises controller 301 may analyze several days' worth of logged events in order to determine a typical day for a user 320. After finding patterns characterizing the typical day, the premises controller 301 may create a schedule of commands that may be sent to the user entertainment devices 306 to simulate the presence of the user 320.

Additionally, the premises controller 301 may analyze the event logs to determine pairs of events. For example, the premises controller 301 may determine that a listening device 305 frequently records a dog barking after a doorbell rings. The premises controller 301 may create a dynamic event that can be triggered by the first event of the pair. Accordingly, when a user is away and the premises controller 301 detects a doorbell ringing, it may instruct a stereo to play the sound of a dog barking. Accordingly, a user profile may be updated with dynamic events that further characterize patterns of activity for the premises 302.

Figure 4B:
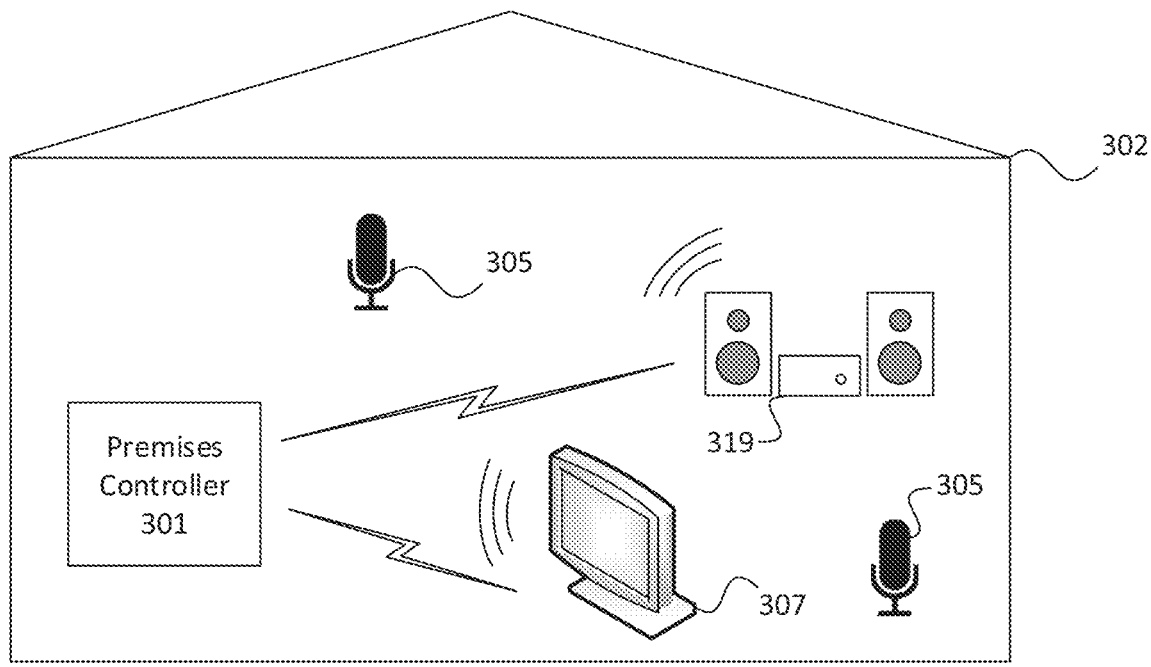

FIG. 4B shows the monitoring and security system operating in a second mode in which a user 320 is away from the premises 302 (e.g., an away mode). The premises controller 301 may send commands to the user entertainment device 306 at certain times as instructed by the schedule of commands. Additionally, the listening devices 305 may continue monitoring the premises for dynamic event triggers. When such a trigger event is detected, an appropriate command may be sent to a user entertainment device 306 in response to the dynamic event.

Figure 5:
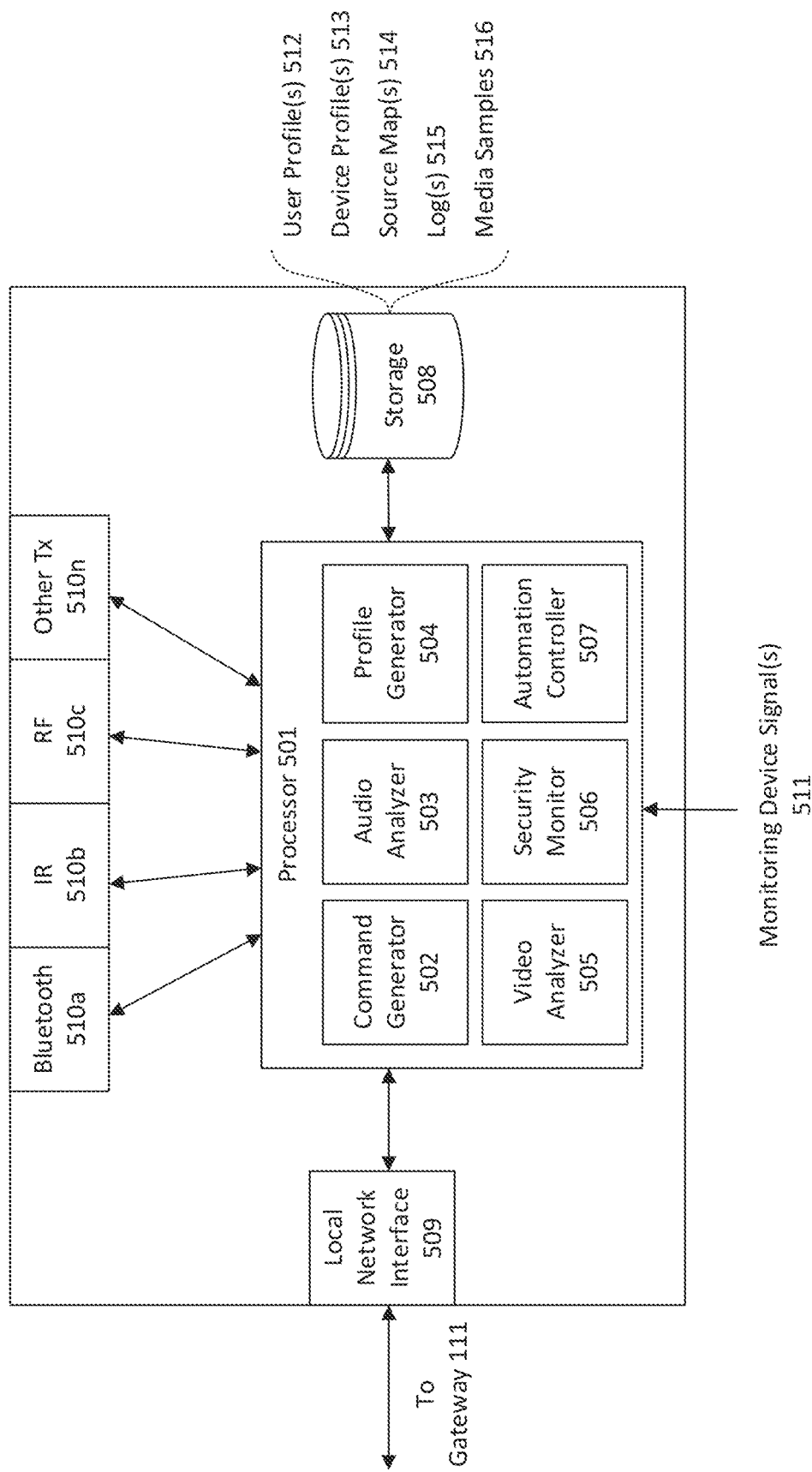
FIG. 5 shows an example premises controller for implementing the functions described herein.

FIG. 5 shows an example hardware embodiment of the premises controller 301. The premises controller 301 contains a processor 501 comprising several modules 502-507 for implementing functions described herein. The processor 501 stores data and accesses data at the storage 508. The processor 501 also transmits (and/or receives) transmissions from transceivers 510*a-n*. The processor 501 connects to a local network interface 509, which may further connect (via a local network 312) to a gateway 111. Signals 511 may be received at the processor from monitoring devices (e.g., listening devices 305 and/or video cameras 310, etc.).

The processor 501 includes a command generator 502 that generates commands or sequences of commands for transmission to user entertainment devices 306 via transceivers 510*a-n*. The command generator 502 may verify that the commands were successfully executed by listening to audio signals received by listening devices 305. For example, after sending a command to a television via an infrared signal, the command generator 502 may check signals 511 to ensure that appropriate sounds are being generated by the television. Accordingly, the command generator 502 may be configured to execute sub-routines to verify that a command or commands were successfully executed by the target user entertainment device 306. The audio analyzer 503 analyzes audio signals received from listening devices 305 in order to detect and/or log audio events. The audio signals may capture sounds generated by user entertainment devices 306, users or residents of the premises 302 (e.g., speech), other devices (e.g., appliances) of the premises 302, or any other sources of audio at the premises 302. The audio analyzer 503 may analyze the audio signals in order to determine meta information about the audio signals. The audio analyzer 503 may determine or estimate a volume of the audio signal, a classification of the audio signal, a room of the audio signal, a device or person that generated the audio signal, as well as other properties.

Similarly, the video analyzer 505 may analyze video signals received from the video cameras 310 in order to detect and log video events. For example, the video analyzer 505 may analyze video signals to determine when lights are on or off. The signals 511 may be received from dedicated interface(s) of the premises controller 301, via one or more of transceivers 510*a-n*, and/or via the local network interface 509. Signals 511 may be received periodically or continuously from the listening devices 305 and/or video cameras 310.

The profile Generator 504 may generate one or more user profiles 512 indicating typical behavior for one or more users. A user profile 512 may be generated based on a log 515 of events analyzed by the audio analyzer 503, video analyzer 505, and/or automation controller 507. For example, if the user typically watches a news program from 7 am to 8 am, listens to music on a stereo from 1 pm to 3 pm, and has the office lights turned on from 7 am to 9 pm, then this behavior may be detected by the audio analyzer 503 and video analyzer 505, and information may be stored in the user profile to indicate this behavior. The user profile 512 may also include a schedule of commands that can be sent to user entertainment devices and/or other controlled devices to create the appearance that one or more residents is at home by, for example, indicating a predetermined time (and/or a randomized time with respect to a predetermined time) when a video device should be activated, and a setting or service that should be activated (e.g., turning on a television and tuning to the news program from 7 am to 8 am, tuning to a stereo should from 1 pm to 3 pm, and turning on the office lights from 7 am to 9 pm). When the system determines that the house is unattended, the system may send automatic commands to control the television/stereo/lights to mimic the same behavior.

The security monitor 506 may implement security functions such as setting and triggering alarms, detecting break-ins, etc. The security monitor 506 may further send alerts or messages to remote devices such as the portable communication device 317 and/or personal computer 318. The automation controller 507 may implement home automation protocols for controlling lights and other smart devices via one or more home automation protocols (e.g., X10, Z-WAVE®, INSTEON®, ZIGBEE®, and other such protocols). The automation controller 507 may also monitor signals transmitted to and/or received from smart devices indicating events (e.g., lights being turning on or off) and log such events in the log 515.

Each of the modules 502-507 may be implemented as software modules, components of software programs, combinations of hardware and/or software components, or the like.

All or a portion of the monitoring and security application 211 may be implemented by the processor 501 and any or all of the modules 502-507. Any or all of the modules 502-507 may be implemented at the network controller 303 instead of or in addition to at the premises controller 301.

Storage 508 includes one or more user profiles 512 generated by the profile generator 504, one or more device profiles 513 specifying controlled devices and their capabilities, one or more source maps 514 for mapping media content to particular media sources, a log 515 of events detected from monitoring device signals 511, media samples 516 for detecting and playing back events, and other data needed by the premises controller 301. Storage 508 may include any type of storage device(s), such as hard drives, flash memory, ROM, RAM, and the like.

The device profiles 513 may indicate device-specific information such as what protocol a user entertainment device 306 uses to receive commands, how commands should be formatted, and the like. The device profile 513 may further specify a room where the device is located. The audio analyzer 503 may determine or estimate, based on information indicating the room, which device (or devices) may have generated a sound recorded by a listening device 305. Additionally, the premises controller 301 may select, based on information indicating the room, which user entertainment device 306 it should command. For example, if a user profile indicates that a resident frequently talks on the phone in the living room, the premises controller 301 may simulate that behavior in the resident's absence by playing an audio file containing speech on the living room stereo. In this example, the device profile 513 for the stereo indicates it is in the living room.

Source maps 514 may indicate sources of content (e.g., television channels) corresponding to remote control commands for a particular service. For example, when a premises controller 301 executes a command to tune a television to MSNBC, it may access the source map 514 to determine the appropriate channel number to send to the television or set-top box. The source map 514 may further indicate which sources are free to access. In some examples, the premises controller 301 selects sources from the subset of sources that are free to access in order to avoid accruing charges for simulating a user's presence in the premises 302.

Media samples 516 may include media files pre-installed in the storage 508, uploaded by a user, and/or downloaded from the network. The media samples 516 may be used by the audio analyzer 503 to recognize certain sounds. For example, the user may upload a recording of the doorbell so that the audio analyzer 503 can recognize the user's doorbell and classify a corresponding event appropriately. Accordingly, the audio analyzer 503 can compare media samples 516 to audio signals received from listening devices 305 to determine metadata about the audio signals. In this example, the media sample 516 may be tagged (e.g., by the user 320) with metadata such as a classification of "doorbell," a particular room, and/or other such metadata.

Additionally, the media samples 516 may be used by the premises controller 301 to play certain sounds. For example, a recording of a dog barking could be played on the stereo to simulate the presence of a dog when a doorbell event is detected. Accordingly, the premises controller 301 may download a media sample 516 associated with the "dog barking" classification when a profile specifies such a dynamic event. Additionally or alternatively, the user 320 may manually upload such a media sample 516, or such a media sample 516 may come pre-installed in the premises controller 301.

Transceivers 510a-n may include one or more transmitters and/or receivers for communicating with user entertainment devices 306 and other devices such as lights 308. For example, a first transceiver 510a may implement a BLUETOOTH® protocol. A transmitter 510b may be an infrared (IR) blaster for emulating remote control commands, such as commands for a television 307 or stereo 319. A transceiver 510c may implement a radio frequency communication protocol, such as ZIGBEE® or WI-FIC). Other transceivers 510n could be used as well.

Figure 6A:
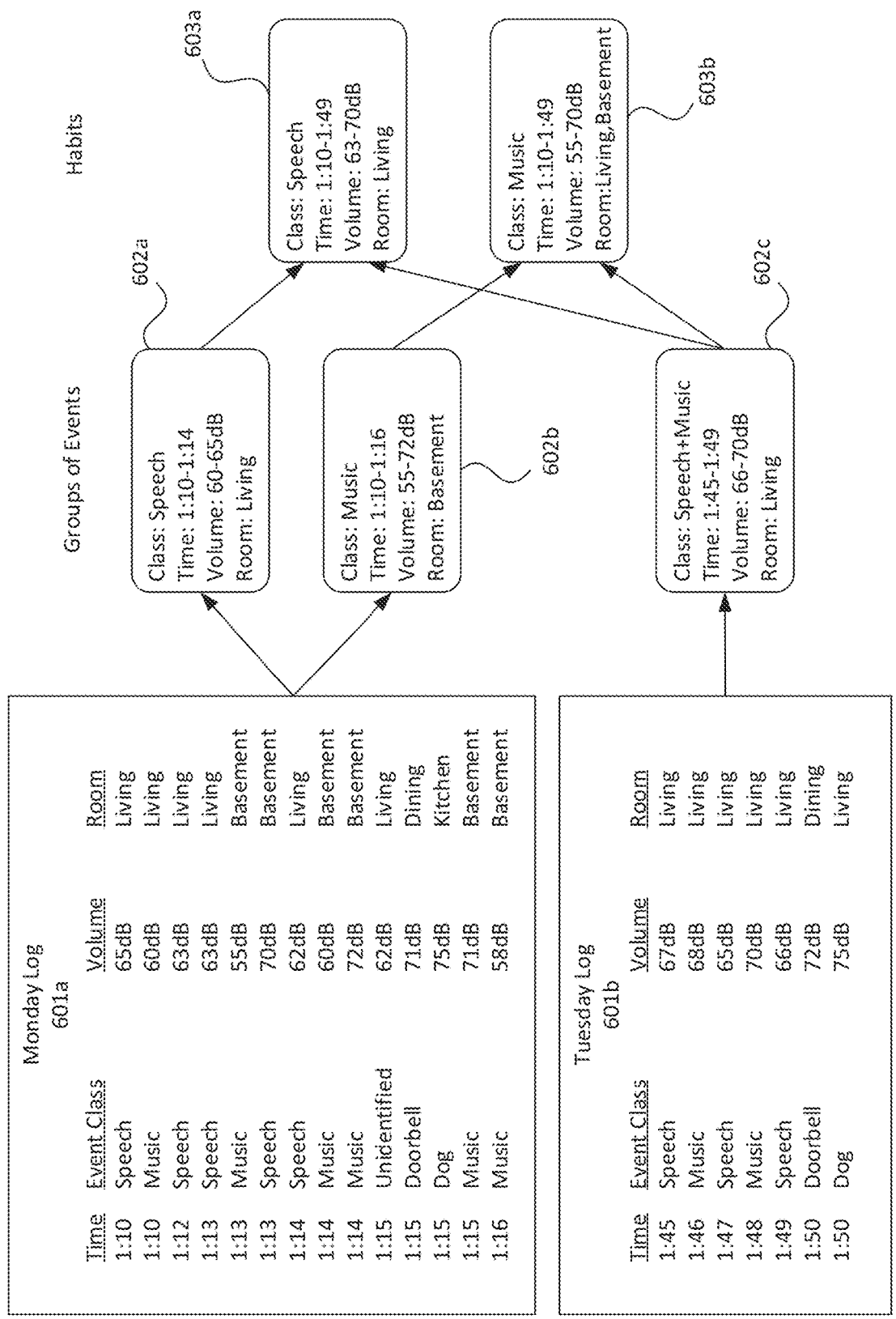
FIGS. 6A-B show example data structures for storing events and generating user profiles.

FIG. 6A shows example data structures including example logs 601a-b, groups 602a-c of events, and habits 603a-b. Logs 601 may include a plurality of events including meta information about each event. Such meta information may include, as shown in FIG. 6A, time information, classification information, volume information, and room information. The meta information may be determined by the audio analyzer 503 and stored in the log 601 for analysis.

The profile generator 504 may analyze the logs 601 and generate data for constructing a user profile. The profile generator 504 may perform a two-step process for generating groups 602 of events from logs 601, followed by generating habits 603 from groups 602 of events. Additionally or alternatively, the profile generator 504 may use other processes to analyze the log 601 data and generate a profile therefrom.

FIG. 6A shows a portion of a log 601a for a first day and a portion of a log 601b for a second day. The profile generator 504 may group events by common values of meta information. The profile generator 504 may group events by time and room information in order to generate groups 602 of events. For example, the profile generator 504 may determine that multiple events in a first log 601a occur in a time period of 1:10-1:14 in the living room. The profile generator 504 may generate a group 602a corresponding to those events.

Such groups 602 may be formed of events having relatively contiguous time values for a given room. For example, if a log 601a contains another event entry at time 1:46 in the living room, the profile generator 504 may avoid adding such an event to the first group 602a because 1:46 is too far in time from the remaining members of the group. Events over a threshold amount of time (e.g., 30 minutes) difference from other events may be split into different groups 602.

In the example of FIG. 6A, the profile generator 504 may analyze the events corresponding to the group 602a and determine that the majority of such events have a "speech" classification. Therefore, the profile generator 504 may assign a "speech" class to the group 602a. The profile generator 504 may detect that above a threshold percentage of events in a group 602 have a single class value, and assign that class value to the group 602. For example, if more than 75% of events in a group 602 have a "speech" value, the entire group may be assigned a "speech" value.

The profile generator 504 may further determine that all of the events in the example group 602a (or a subset of events, for example the subset of events classified as "speech") have volume properties within a given range (e.g., 60-65 dB). Accordingly, the profile generator 504 may assign the given volume range to the group 602a as shown in FIG. 6A.

The profile generator 504 may determine multiple groups 602 from a single log 601a. For example, the profile generator 504 may determine a second group 602b corresponding to events occurring between 1:10-1:16 in the basement. The profile generator 504 may assign a classification and a volume range to the group 602b in a similar manner as for the group 602a.

The profile generator 504 may determine additional groups from a log 601b for a second day. The profile generator 504 may be configured to assign multiple classes to a single group 602, such as when events of the group 602 are split fairly evenly between classifications. For example, because the log 601b contains a number of events with both music and speech classifications, the group 602c may be assigned two classifications as shown in FIG. 6A. The remaining properties of the group 602c may be assigned as for the other groups 602a, 602b.

The profile generator 504 may form groups 602 based on one or more other properties instead of or in addition to time and room properties. For example, the profile generator 504 may form groups 602 of events having the same classification, such that each group has at most one classification. Additionally, the profile generator 504 may form groups 602 based on how close in volume events are to each other, such that relatively loud events may be split into different groups from relatively quiet events. Additionally, any other properties included as meta information for an event may be used for forming groups 602. Such properties may include a device or person that generated the sound, a type of the event, a frequency property of the event, or any other property of the event.

After forming the groups 602 of events, profile generator 504 may further analyze the groups 602 to form habits 603. Habits 603 may be formed by comparing groups 602 across different days. Groups 602 corresponding to two or more days may be compared. When profile generator finds matching (or partially matching) groups of events across multiple days, it may create a habit 603. For example, when profile generator 504 determines that groups 602a and 602c are partial matches in terms of class (e.g., both groups contain a "speech" class), time of day (e.g., the groups time ranges are relatively close together), and room (e.g., both groups indicate the living room), it may generate a habit 603a based on the properties of groups 602a and 602c.

The profile generator 504 may determine a partial match based on one or more values of meta information being the same or similar. In some examples, the profile generator 504 may generate a habit if the time information is similar (e.g., if time ranges for the two groups overlap at least partially, or have less than a certain amount of time between an end time of one group and a start time of the other, or if some other measure of time similarity indicates the time information is similar). In the example of FIG. 6A, the profile generator 504 may determine that groups 602a and 602c are similar in terms of time because they occur within a threshold time of each other (e.g., 2 hours). Other thresholds may be used to determine similarity of other properties (e.g., within 10 dB for volume).

The profile generator 504 may determine that two groups are a partial match even when some properties are not the same or similar. For example, two groups 602b and 602c may be determined as partial matches even though the room values are different.

The profile generator 504 may generate the habits 603 based on the properties of the matched groups 602. For example, the time range of a habit 603a may be set using the earliest and latest times of corresponding groups 602a and 602c, the volume range may be set using the quietest and loudest volumes of corresponding groups 602a and 602c, etc. The profile generator 504 may determine the properties of a habit 603 based on the union/overlap of the property values of the matched groups, the average values of the properties of the matched groups, or based on some other method of combining the properties of two or more groups. For example, the value of the room property for a habit 603b may include the values of both room properties for matching groups 602b and 602c.

The profile generator 504 may use the habits 603 in order to generate commands for simulating a user's presence. Such commands may be generated taking into account the devices connected to the system and a user's preferences. The generated commands may be added to a schedule of the user profile 512.

Figure 6B:
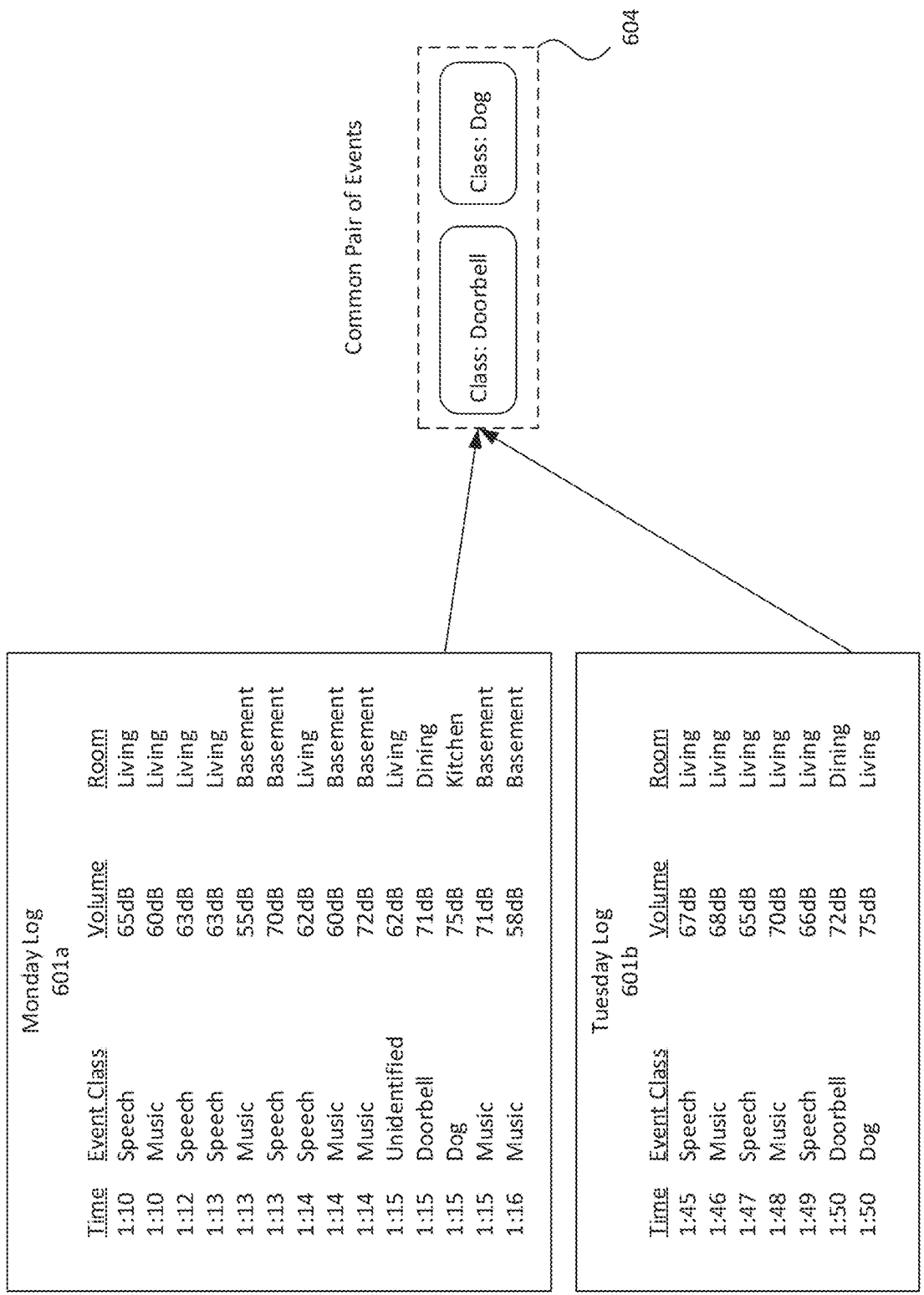

FIG. 6B further shows a pair 604 of events detected from multiple days' logs 601a, 601b. In the example of FIG. 6B, the profile generator 504 detects that events classified as "doorbell" and "dog" frequently occur together in a particular order. Accordingly, the profile generator 504 may detect that every time (or above a threshold percentage of the time) a first event occurs, a second event occurs. The profile generator 504 may create a pair 604 including the first and second events. The pair 604 may be used to create dynamic events so that a premises controller 301 can dynamically simulate a user's presence.

Figure 7A:
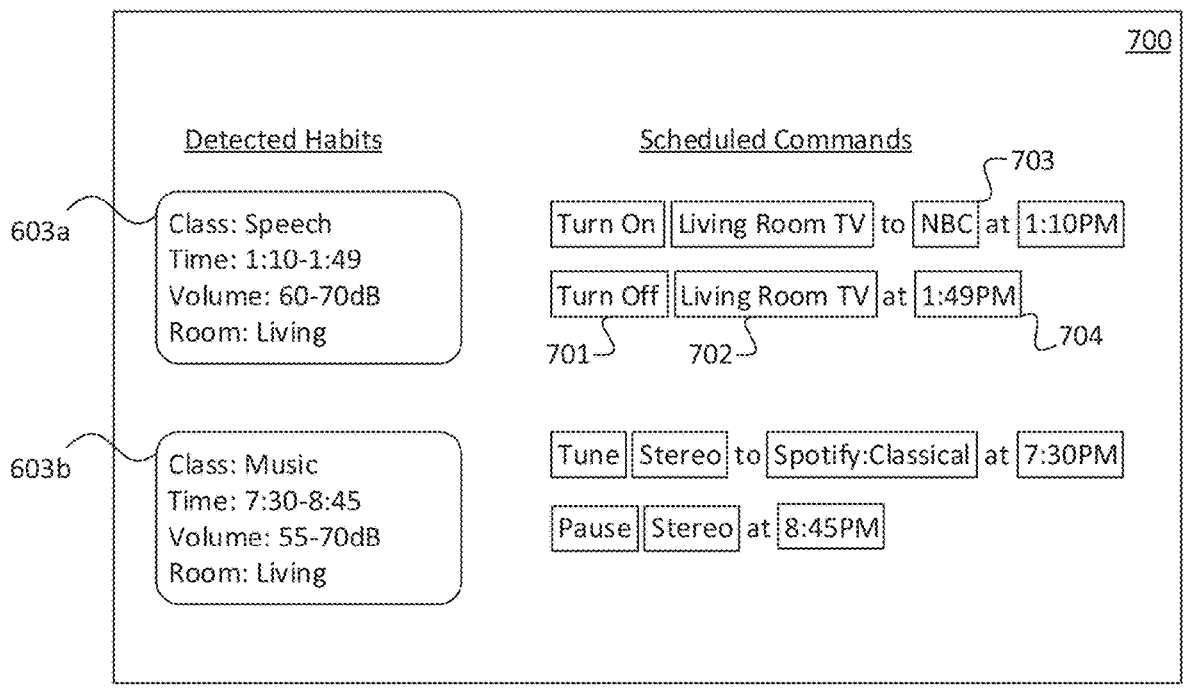
FIGS. 7A-B show example user interfaces for adjusting a user profile.

FIG. 7A shows an example user interface 700 by which a user 320 can adjust a schedule of commands generated by the profile generator 504 based on the habits 603. The profile generator 504 may generate commands based on properties assigned to the habits 603. For example, commands for turning the television on and off may be generated based on a habit 603a.

The profile generator 504 may select a device 702 to receive the one or more commands based on properties of the habit 603. Command preferences may specify mappings between properties of a habit 603 and a device 702 that will receive a command. For example, command preferences may map a living room television to a class property indicating "speech" for the habit 603a. The command preferences may indicate that "music" habits map to a stereo device. The command preferences may further indicate that other properties (e.g., a property indicating a room) map to particular devices 702.

The profile generator 504 may choose the selected device 702 from among several devices indicated by the command preferences based on a room property. For example, the profile generator 504 may select the living room television as indicated by the room property of habit 603a.

After choosing a device 702, the profile generator 504 may construct one or more commands for the device 702 based on additional properties of the habit 603, one or more device profiles 513, a source map 514, and additional command preferences. For example, the profile generator 504 may select "turn on" and "turn off" actions 701 based on the device profile 513 for the living room television indicating it accepts those commands. In this example, the profile generator 504 may select "NBC" for an optional source parameter 703 based on a source map 514 and command preferences. For example, command preferences may indicate that NBC should be selected to emulate a speech habit. The profile generator 504 may further select times 704 for the commands based on time properties of a habit 603.

Similarly, the profile generator 504 may select a stereo device 702 that matches a class property indicating "music" for a habit 603b. The remaining actions 701, optional parameters 703, and time 704 for the corresponding commands may be generated by profile generator 504 as discussed above. Particularly, actions 701 may be determined based in part on capabilities of a device that will receive the command. Such capabilities may include particular commands or types of commands that a device can execute. The profile generator 504 may retrieve the capabilities of a device from a corresponding device profile 513. Optional parameters 703 may be determined based on command preferences indicating, for example, one or more preferred sources of media content. Time 704 may be determined based on a time property of the habit 603 (which may reflect, for example, one or more times associated with a plurality of logged events, or one or more times associated with patterns of events).

The user interface 700 may be an interactive user interface by which a user 320 can edit the scheduled commands. For example, a user 320 may select and/or interact with an element 701-704 of one of the commands in order to adjust it. Therefore, a user 320 may modify the schedule of commands as desired.

Figure 7B:
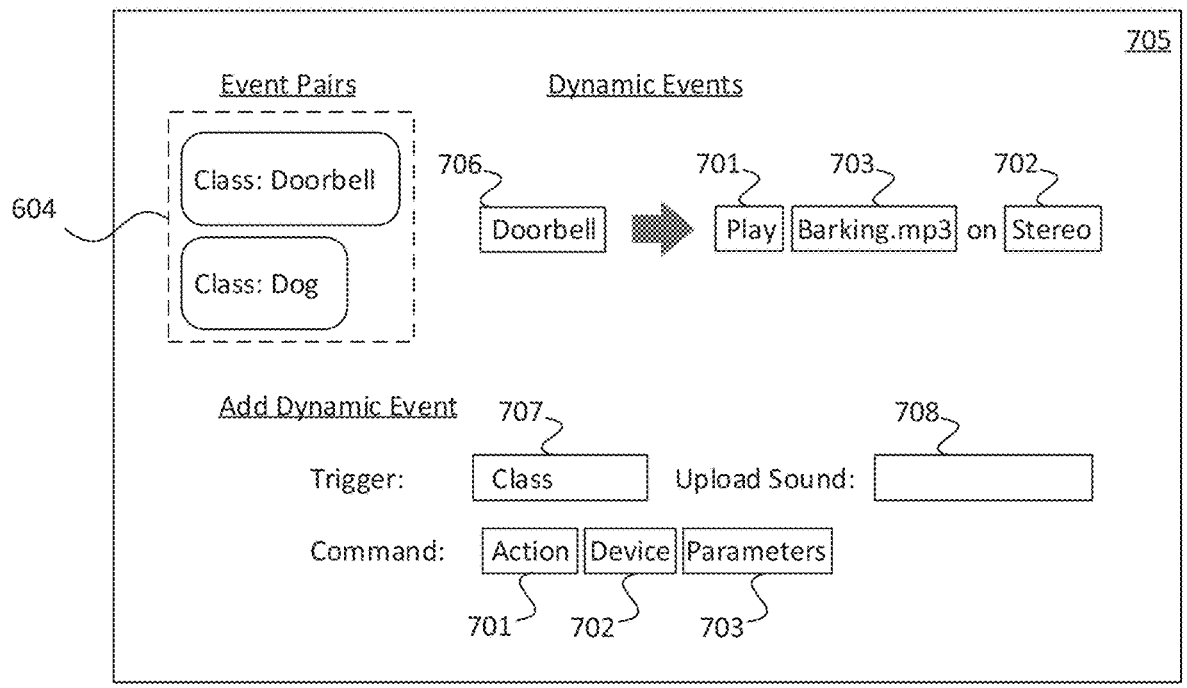

FIG. 7B depicts a user interface 705 by which a user 320 may view and modify a list of dynamic events generated by the profile generator 504. The dynamic events may be generated based on a pair 604 of events detected by the profile generator 504. The profile generator 504 may select the first event of the pair 604 (e.g., a doorbell ringing) as the trigger and create a command that will be executed when the first event is detected (e.g., playback of a sound of a dog barking).

As before, the profile generator 504 may select a device 702 to receive one or more commands based on properties of a pair 604 of events. For example, to emulate a dog barking, the profile generator 504 may play a corresponding sound file on the stereo. The commands may be configured based on command preferences, device profiles 513, and any other settings.

The user 320 may interact with the interface 705 to edit the list of dynamic events. The user may add a dynamic event by selecting a trigger 707, optionally uploading 708 a sound file corresponding to the trigger, and/or setting one or more of actions 701, device 702, and parameters 703 for the command. The profile generator 504 may create a dynamic event that triggers when the selected trigger 707 is detected (which may be based on detecting a match with the sound file 708). When the trigger 707 is detected, the corresponding command may be executed.

Users 320 may access the user interfaces 700, 705 via a user device, such as a portable communication device 317 or personal computer 318. The user interfaces 700, 705 may be generated by the premises controller 301 and/or network controller 303.

Figure 8:
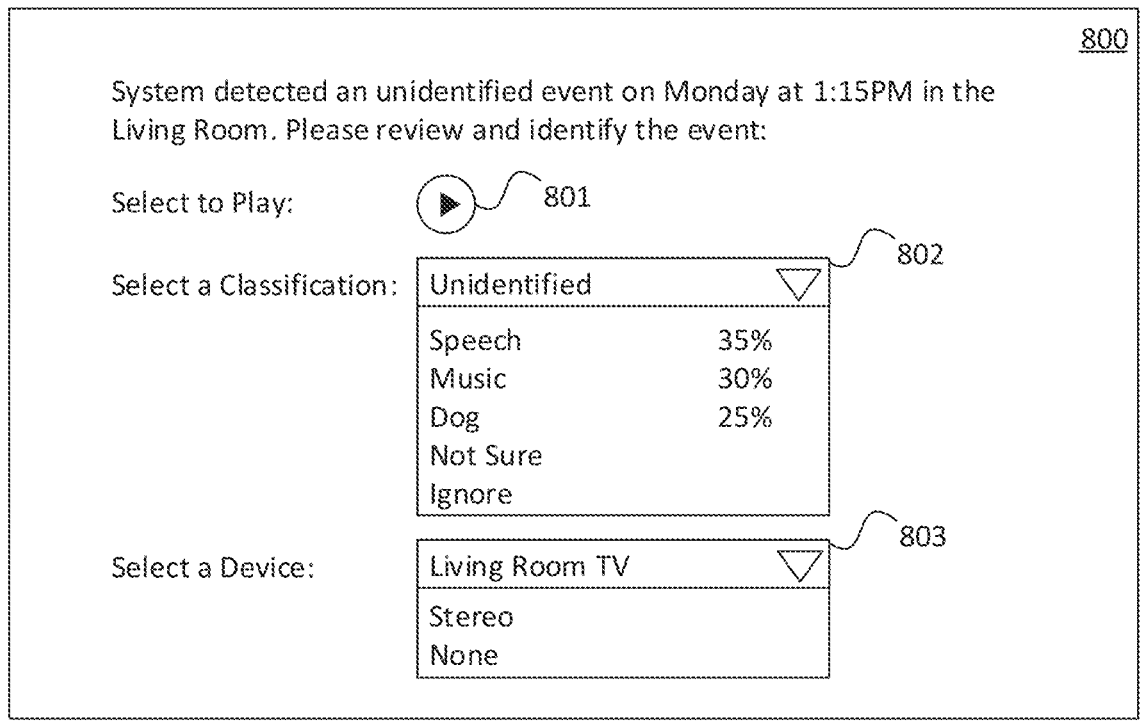
FIG. 8 shows an example user interface for identifying audio signals received by the monitoring and security system.

FIG. 8 shows a user interface 800 by which a user 320 may identify an event that the audio analyzer 503 was unable to classify. When the audio analyzer 503 is unable to classify an event, it may send an alert to a user device, such as the portable communication device 317 or personal computer 318. A user of the user device may access the user interface 800 to resolve the unidentified event.

The user interface 800 may include a button 801 for playing back the unidentified event. The premises controller 301 may store a recording of the unidentified event in storage 508 so that a user can play back the recording upon selection of the user interface playback button 801.

The user interface 800 may further include a selector 802 for selecting a classification of the unidentified event after the user listens to the recording. For example, the audio analyzer 503 may have indicated one or more classifications with low confidence. Accordingly, the selector 802 may contain the indicated classifications indicated along with confidence levels determined by the audio analyzer 503. The classifications may be ranked in order of their determined confidence levels. Additionally or alternatively, the selector 802 may present a list of all classifications used by the system for selection by the user.

The selector 802 may further include an additional "not sure" option for indicating that the user cannot identify the sound. The selector 802 may additionally include an "ignore" option that causes the sound (and matching sounds) to be ignored by audio analyzer 503 (e.g., not logged and/or not simulated) in the future.

The user interface 800 may include additional selectors for indicating other properties. For example, a selector 803 may be used to indicate a device from which the sound originated. The list of devices in the selector 803 may be limited to devices in the same room as the listening device 305 that recorded the sound.

After a user indicates the correct values for the event, a log 601 may be updated with the resolved event data. The profile generator 504 may re-analyze the updated log 601 after unidentified events have been resolved by the user.

Figure 9:
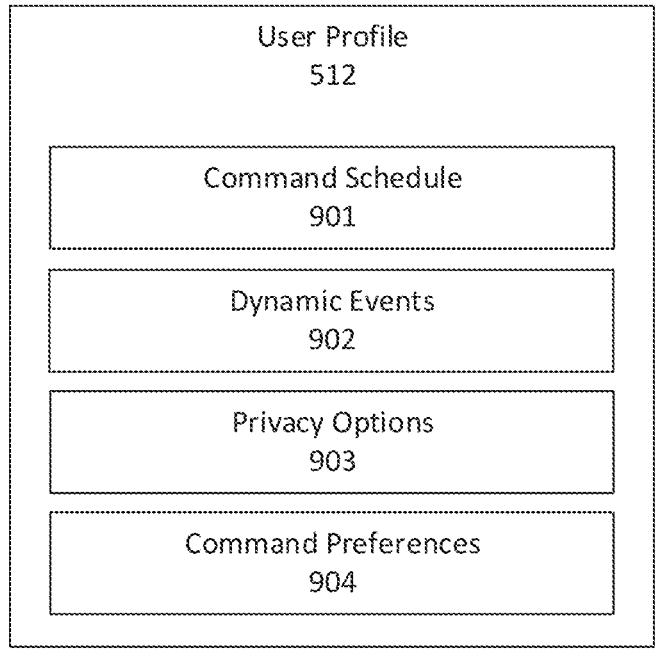
FIG. 9 shows an example data structure of a user profile.

FIG. 9 shows a data structure for the user profile 512. The user profile 512 may comprise a command schedule 901 for storing the schedule of commands generated by the profile generator 504, dynamic events 902 for storing the dynamic events generated by profile generator 504, privacy options 903 for controlling listening devices 305, and command preferences 904 used to generate the schedule of commands and dynamic events.

The command schedule 901 and dynamic events 902 may store commands for operating user entertainment devices 306. The command schedule 901 and dynamic events 902 may also store additional data about commands, such as which transceivers 510 to use to send a particular command, the format and/or protocol of commands, and one or more scripts for verifying that a command was successfully executed. The profile generator 504 may select a transceiver 510 based on the capabilities of a device 702 of the command. The profile generator 504 may further store a format and/or protocol for the command as indicated by the device profile 513 for the device 702. For example, a television 307 may be configured to accept commands via an IR blaster 510b. Accordingly, the profile generator 504 may store (e.g., along with a command for the television 307) an indication of what data to send via the IR blaster 510b in order to execute a command. Additionally, one or more scripts may be provided that verify a command was executed. An example script is described below with respect to FIG. 11.

Privacy options 903 may indicate times and/or modes for which selected (or all) listening devices 305 should be disabled. For example, privacy options may indicate that all listening devices 305 should be disabled in a night mode, or between certain hours, or that only particular listening devices 305 should be disabled in certain modes or times. The audio analyzer 503 may check the privacy options 903 in order to ignore audio signals received from particular listening devices 305 at time and/or modes specified by the privacy options 903.

Command preferences 904 may indicate preferred settings for constructing commands by profile generator 504. For example, a user may prefer certain television or audio sources (which may be specified as parameters 703) for emulating habits 603, certain devices 702 for emulating habits 603, and the like. Accordingly, the command preferences 904 may contain mappings that indicate how certain properties of habits 603 indicate parameters 701-703 for commands. The command preferences 904 may additionally or alternatively contain default mappings that a user 320 can override. For example, a default mapping may indicate that a news channel may be tuned on a television to emulate a habit with a "speech" class. However, a user may override the default preference and indicate, for example, that a sports channel should be tuned on the television to emulate the habit with a "speech" class.

Figure 10:
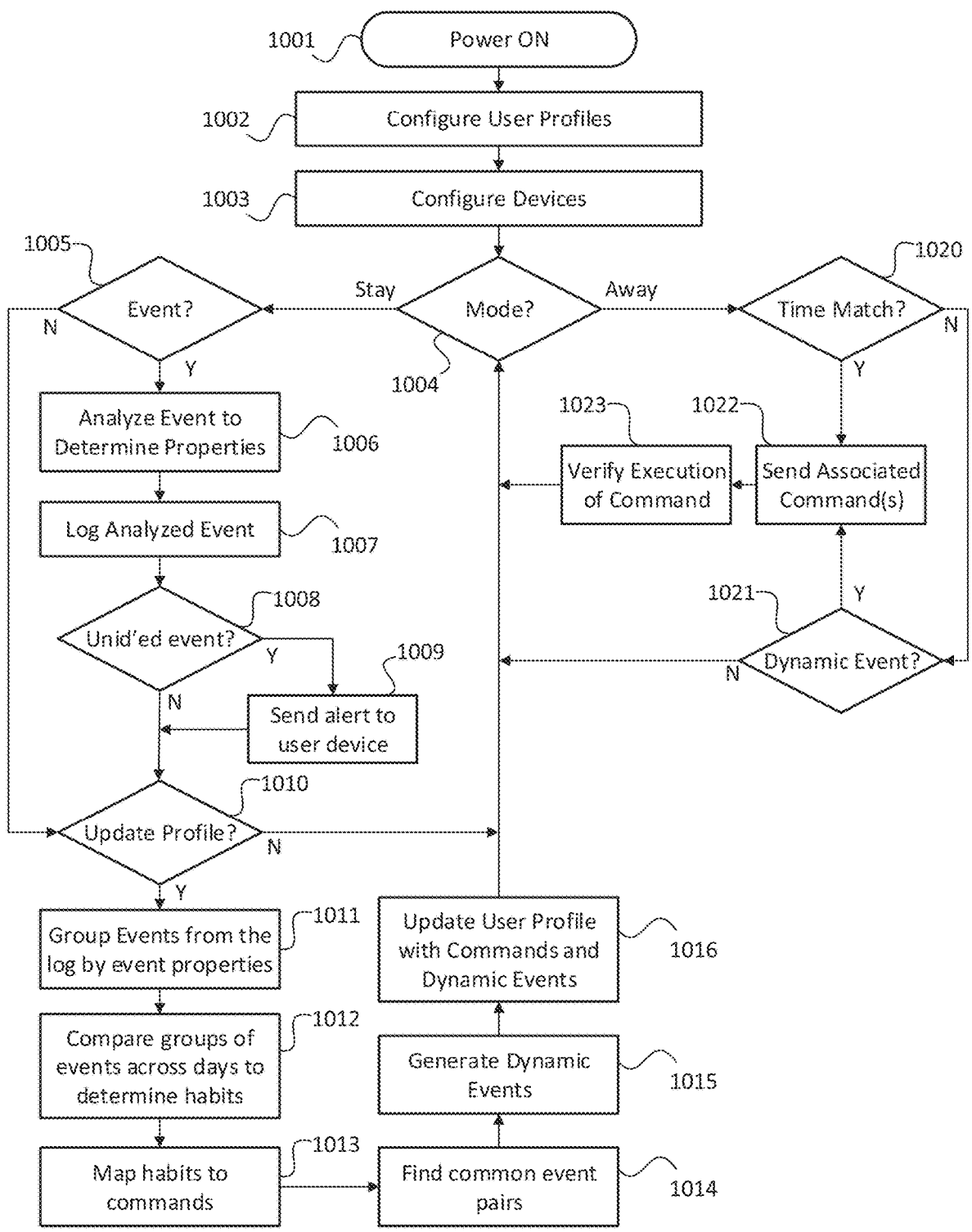
FIG. 10 shows an example process flow diagram implemented by a processor for carrying out monitoring and security functions described herein.

FIG. 10 shows an example process flow for processor 501 of premises controller 301. The premises controller 301 may be turned on at step 1001. Before entering a main loop, the premises controller 301 may execute configuration steps 1002, 1003. At step 1002, the premises controller 301 may configure one or more user profiles 512. On a first boot, the premises controller 301 may create a default user profile 512 and/or generate configuration prompts for creating one or more user profiles 512 based on inputs from user(s) 320. A user may be prompted for favorite sources that may be stored in command preferences 904 of the user profile 512. A user may be presented with a user interface 700 for configuring a default command schedule 901 of the user profile 512.

At step 1003, the premises controller 301 may configure one or more devices, such as listening devices 305, user entertainment devices 306, or other premises devices. The premises controller 301 may establish communications with such devices in order to determine device capabilities and populate a device profile 513 for each device. Additionally or alternatively, the premises controller 301 may prompt the user 320 for information about devices in order to configure device profiles 513. Steps 1002 and/or 1003 may be executed at any time based on receiving a communication from a user device, such as a portable communications device 317 or personal computer 318. For example, a user 320 may configure a user profile 512 at any time by connecting to the premises controller 301 via the Internet.

At step 1003, the premises controller 301 may determine the mode of the security system. The premises controller 301 may regularly poll the alarm panel 304 of the security system to determine the mode, or the alarm panel 304 may send a message to the premises controller 301 when the mode is changed automatically or by a user 320. When the mode is set to "stay," the premises controller 301 may proceed to decision 1005 to determine whether an event is detected.

At decision 1005, when the mode is set to "stay," the premises controller 301 may monitor events to determine whether an event has been detected from audio received by listening devices 305 and/or video received from a video camera 310. The audio analyzer 503 of premises controller 301 may continually receive and process audio signals from listening devices 305 to detect events. For example, the audio analyzer 503 may store the most recent N seconds or minutes of audio from each listening device 305 (e.g., in a circular buffer). The audio analyzer 503 may periodically or continually receive and analyze portions of any or all of the audio signals in order to detect events. The audio analyzer 503 may measure temporal characteristics of the audio signals, such as volume over time or change in volume over time, in order to detect an event. Thus loud noises recorded in the audio signals may be flagged as events. Accordingly, the audio analyzer 503 may indicate an event when the volume of one or more audio signals is above a threshold (e.g., 55 dB), remains above a threshold for a certain duration of time, and/or changes in volume at certain rates.

The audio analyzer 503 may additionally or alternatively analyze frequency characteristics of the audio signal, such as frequency components, spectral centroid, spectral flux, and/or spectral density to detect events. The audio analyzer 503 may flag signals containing certain frequency characteristics as events. The audio analyzer 503 may use Fourier transforms, wavelet transforms, and the like to obtain the frequency characteristics of the signal to detect an event.

Upon detecting an event, the audio analyzer 503 may store an indication of an event along with the audio corresponding to the detected event. Accordingly, when an event is detected at decision 1005, the premises controller may analyze the event to determine its properties at step 1006.

The premises controller 301, via the audio analyzer 503, analyzes events in order to determine information about the event that can be stored in a log 601 for later analysis by the profile generator 504. The audio analyzer 503 may analyze features of the audio signal in order to determine properties of the event. The audio analyzer 503 may use one or more classification algorithms to analyze the audio signals corresponding to each event. Accordingly, the audio analyzer 503 may extract one or more features from the audio signal and classify the detected event using one or more classification algorithms. Such features may include time-domain features (such as short-time energy, average zero crossing rate, etc.), frequency-domain features (such as mel frequency cepstral coefficients, spectral flux, spectral centroid, etc.), or other features of the audio signal. The classification algorithms may determine whether a detected event is recognized by a classifier trained to categorize audio signals as matching one or more of a defined set of classes (e.g., speech, music, a dog barking, etc.). Various classification algorithms, such as linear classifiers, support vector machines, neural networks, and other such classification algorithms can be used by the audio analyzer 503 to analyze the events at step 1006.

The audio analyzer 503 may additionally detect a volume property of an event and assign a corresponding volume property. The audio analyzer 503 may calculate an average volume of the event, a max volume of the event, or some other measurement of volume. The audio analyzer 503 may optionally use a frequency weighting filter such as A-weighting, or ITU-R 468 noise weighting, in order to more realistically measure perceived volume. Thus audio analyzer 503 may further assign a volume property as part of step 1006.

The audio analyzer 503 may additionally determine or estimate a room associated with the event and assign a corresponding room property. The audio analyzer 503 may determine or estimate the room based on which listening device 305 recorded the audio signal corresponding to the event. The audio analyzer 503 may look up the room associated with the listening device 305 that recorded the corresponding audio signal (e.g., from a device profile 513 for the listening device 305), and assign the room property accordingly. Multiple listening devices 305 may generate similar events at the same time (e.g., because multiple listening devices recorded the same event). The audio analyzer 503 may detect that similar audio signals were recorded by multiple listening devices 305 by comparing the audio signals, or the properties of events detected from the audio signals. Accordingly, the audio analyzer 503 can estimate a room or rooms where the event may have occurred based on the volume and/or timing of each received audio signal (e.g., the highest volume and/or earliest received audio signal may indicate the closest listening device 305). Additionally, the audio analyzer 503 may use relative timing to compare the audio signals to "triangulate" a distance and/or location of the audio event relative to the listening devices 305 in order to determine a room. Each listening device 305 may contain multiple microphones (e.g., an array of directional microphones) generating multiple audio signals in order to assist in room estimation. Such listening devices 305 could process the multiple audio signals locally in order to estimate a direction and/or location of the audio event before transmitting that information to the audio analyzer 503. Accordingly, the audio analyzer 503 may assign room properties as part of step 1006.

Other properties may be assigned by the audio analyzer 503. For example, the one or more classifiers may further indicate sub-classifications, such as a genre of a music class, a gender or age for a speech class and the like. The audio analyzer 503 may identify a particular piece of media content, for example, by comparing a fingerprint of the audio signal to a database of media content fingerprints. Such a comparison could be used to identify additional meta information about the audio signal. The audio analyzer 503 may also estimate a device that generated an event based on the room and class properties. For example, if an event is classified as "music" and has a room property indication "living room," the audio analyzer 503 may estimate that a living room stereo generated the event and assign a corresponding device property.

At step 1007, the premises controller 301 stores the analyzed event (e.g., indicators of the event and its associated properties determined by the audio analyzer 503) in a log 601. The log 601 may additionally contain a timestamp marking the time when an event was recorded by a listening device 305. Thus, the premises controller 301 may build up the log 601 over time so that it can be processed by the profile generator 504.

The audio analyzer 503 may attempt to classify an audio signal corresponding to an event, but classification algorithms may indicate a low confidence of an accurate classification. In that case, the event may be classified as "unidentified" in the log 601. At decision 1008, the premises controller 301 may check whether the log 601 contains an event classified as "unidentified." When such an event is detected, the premises controller 301 may send an alert to a user device so the user 320 can identify the event if desired.

The alert may contain a link by which a user can access a user interface 800 for resolving unidentified events. The user identification of the event can be used to re-train or otherwise improve classifiers.

At decision 1010, the premises controller 301 may determine whether to update a user profile. The premises controller 301 may cause the profile generator 504 to update the user profile 512 at regular intervals, e.g., daily or weekly. Additionally or alternatively, the profile generator 504 may update the user profile 512 when a log 601 contains above a threshold amount of data, above a threshold number of events, or some other measure indicating an amount of data in the log 601. The profile generator 504 may update the user profile 512 regardless of the alarm mode. When the profile generator 504 determines to update the user profile 512, it processes data in the log 601 to determine a command schedule 901 and/or dynamic events 902.

At step 1011, the profile generator 504 creates groups 602 of events having common properties (e.g., events that occur in common rooms within common time frames). The profile generator 504 thus summarizes what was happening within the premises 302 at given times. The groups 602 of events may be assigned a particular class common to the events within the group 602 (or above a threshold number or percentage of the events within the group 602). For example, a group may be assigned a "speech" class because a majority of the events within the group were classified as speech events.

The groups 602 of events may be assigned a volume property in addition to or as an alternative to the class property. The assigned volume property may be an average of the volume properties assigned to the events of the group 602, or it may be a range encompassing all (or a majority) of the volume properties of the events of the group 602.

At step 1012, the profile generator 504 may compare two or more event groups 602 across multiple days in order to determine patterns of activity at the premises. The profile generator 504 generates habits 603 that indicate such patterns of activity based on the group comparison (e.g., by combining properties of the two or more groups 602, averaging such properties, finding the union of such properties, etc.).

At step 1013, the profile generator 504 may map the habits 603 to one or more commands that emulate the habits 603 when a user is away. For example, a habit 603 indicating a user often listens to music in the afternoon may map to a command to turn on a user's stereo in the early afternoon and turn it off in the late afternoon. The mappings of habits to commands may be based on one or more command preferences 904. The command preferences 904 may indicate what types of commands should be generated based on properties of habits 603. For example, a habit with a "speech" property may be mapped to a particular device (e.g., a television) and source (e.g., MSNBC), so that the profile generator 504 creates appropriate commands to operate the device at a time indicated by the habit 603.

At step 1014, the profile generator 504 searches for pairs 604 of events in the logs 601. Pairs 604 may include one or more events that frequently occur together in a particular order. Examples of such pairs 604 may be "phone ringing" followed by "speech," "doorbell ringing" followed by "dog barking," "music" followed by "dim lights," and the like. The profile generator 504 may find the pairs 604 in the log 601 by determining that above a threshold percentage of the time a first event is detected, a second event is detected within a particular time frame (e.g., 30 seconds). Additionally or alternatively, the profile generator 504 may find such pairs 604 based on determining that two events occur in a particular order (e.g., in a particular time frame) above a threshold number of times.

At step 1015, the profile generator 504 generates dynamic events 902 based on the pairs of events. The first event of the pair may be set as a trigger 706 for sending a command when an event corresponding to the trigger 706 is detected. For example, a command may be generated to play an audio recording of speech after premises controller 301 detects a phone ringing event. The profile generator 504 may use command preferences 904 in a similar fashion as for step 1013.

At step 1016, the profile generator 504 updates the command schedule 901 of the user profile 512 with the commands generated at step 1013, and updates the dynamic events 902 of the user profile 512 with the triggers and commands generated at step 1015. The update of the profile 512 may then be completed and the process flow may return to decision 1004 and restart the "stay" mode loop.

When the mode is set to "away," the premises controller 301 attempts to emulate patterns of behavior at the residence using the command schedule 901 and dynamic events 902 of the user profile 512. Accordingly, when the premises controller 301 detects an away mode at decision 1004, the premises controller 301 may proceed to decision 1020. At decision 1020, the premises controller 301 may compare the current time to the command schedule to determine whether any scheduled commands are due for execution.

When a current time matches a time in the command schedule, at step 1022 the premises controller 301 causes the command generator 502 to transmit a corresponding command (or commands) to one or more user entertainment devices or other devices in accordance with the command schedule 901. A single entry in the command schedule may contain multiple commands for one or more devices. For example, a scheduled entry for tuning a television to a certain channel may include multiple commands for turning on a television, changing the volume of the television, changing the channel of a set top box, etc. In addition to or as an alternative to sending a command at an exact time indicated by the command schedule 901, the command generator 502 may transmit the command at a randomized time with respect to the time indicated in the command schedule 901. For example, a command scheduled for 7:00 PM may be transmitted at a random time within 15 minutes before and/or after 7:00 PM.

At step 1023, the command generator 502 may optionally verify that the command (or commands) was successfully executed. The command generator 502 may execute one or more sub-routines to verify that an action was successfully performed by the instructed user entertainment device based on feedback from listening devices 305. For example, the listening devices 305 may record an audio signal containing music after the command generator 502 sends a command to play music, which may indicate that the command was successfully executed. An example of such a sub-routine is further described with respect to FIG. 11.

At decision 1021, the premises controller 301 monitors listening devices 305 (e.g., via audio analyzer 503) to detect an event that matches a dynamic event trigger 706. The audio analyzer 503 may detect events in a similar manner as for decision 1005 and analyze the event in a similar manner as for step 1006. The audio analyzer 503 may use the same classifiers as for step 1006 to determine properties of the event before matching the event to a dynamic event trigger 706. The audio analyzer 503 may use different classifiers in addition to or instead of the classifiers described with respect to step 1006. For example, the audio analyzer 503 may use real-time classifiers to detect and/or analyze events at decision 1021. Real-time classifiers may be optimized to quickly detect short-term events such as a "doorbell" or a "phone ringing."

When a dynamic event trigger 706 is detected, at step 1022 the command generator 502 sends a command specified by the dynamic events 902 in a similar way as for the command specified by command schedule 901.

The process flow shown in FIG. 10 and described above is an example operational representation of the process executed by the processor 501 and is not meant to imply any particular programming techniques, hardware structure, or code structure. For example, programming techniques that do not use mode-switched loops and/or event-driven architecture are meant to fall within the ambit of the disclosure.

Figure 11:
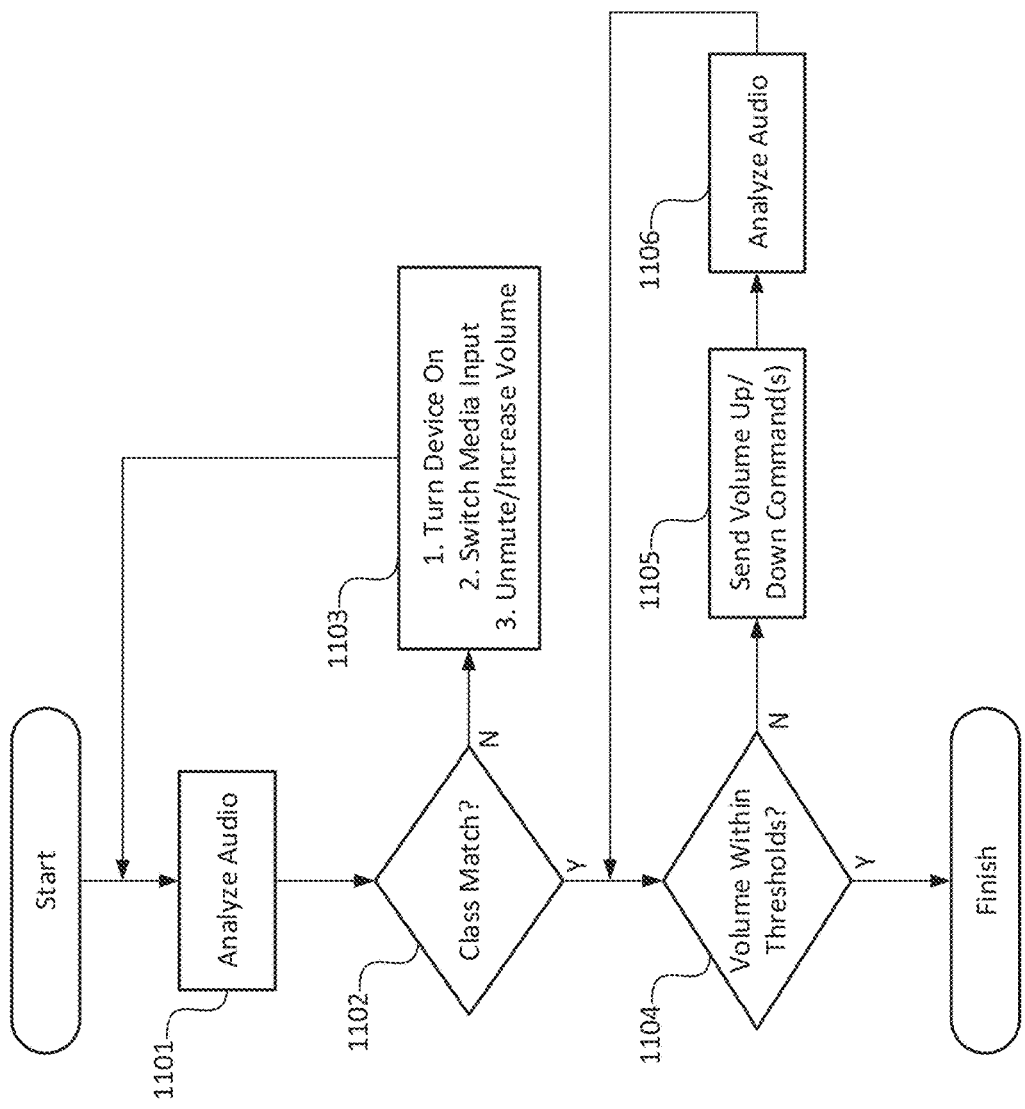
FIG. 11 shows an example process flow diagram for verifying execution of commands transmitted to user entertainment devices.

FIG. 11 shows an example process for verifying execution of a command sent to a user entertainment device 306 by the command generator 502. Such a process may be used, for example, by the command generator 502 in order to tune a television 307 to a particular source (e.g., the "Turn on TV to NBC" example of FIG. 6). The process of FIG. 11 is exemplary, and other processes could be used by the command generator in order to carry out other types of commands.

Prior to block 1101, the command generator 502 generates and transmits (e.g., via IR transmitter 510*b*) a command to set the user entertainment device to a selected media content. For example, the command generator 502 may formulate one or more IR commands to effect a media source change (e.g., a channel change) or a media input change using a format recognized by a television 307. The command generator 502 may access a device profile 513 that specifies how commands for a particular device should be formatted. Additionally or alternatively, the command generator 502 may access source maps 514 that indicate what sources correspond to particular content.

After sending the command, the processor 501 and/or command generator 502 may be unaware of whether the command was successfully executed by the instructed user entertainment device 306. Many user entertainment devices 306 use one-way communication links such as infrared. These devices 306 often lack a back channel to indicate what state the device 306 is in so that successful execution of a command can be verified. For example, an infrared command sent to a television 307 might fail because the television is off, the television is set to the wrong input, or something blocked the line of sight between the IR transmitter 510*b* and the television 307.

At block 1101, the command generator 502 may instruct the audio analyzer 503 to analyze an audio signal received after the command was sent in order to determine whether the command was successfully executed. For example, the command generator 502 may instruct the audio analyzer 503 to analyze an audio signal from a listening device 305 in the same room as the instructed user entertainment device 306. The audio analyzer 503 may analyze the signal as described at step 1006 in order to determine properties of the audio signal.

At decision 1102, based on the analysis of the audio signal at block 1101, the command generator 502 determines whether a class of the audio signal matches the transmitted command. For example, a class property of "music" or "speech" may indicate that a command to turn on a television was successfully executed (e.g., because sounds from a television often contain music or speech). The command generator 502 may use command preferences 904, which may map classes to particular commands, in order to detect which classes indicate successful execution of a particular command or commands.

Additionally or alternatively, at decision 1102 the command generator 502 may detect a match of one or more other properties in addition to or as an alternative to a class property. For example, the command generator 502 may detect a match of an event with the same room property as the device to which the command was sent. The command generator 502 may detect a match when a volume property is above a certain threshold.

If no match is detected, at step 1103 the command generator 502 may determine that the instructed device 306 is off, set to the wrong input, muted, or has its volume turned down. Accordingly, the command generator 502 may send one or more commands to turn the device on, switch the input, turn up the volume, and/or turn off the mute before looping back to the start of the process. The command generator 502 may randomly choose one of the options on each successive iteration of the loop, or the command generator 502 may cycle through each option on successive iterations.

When a match is detected, the command generator 502 may proceed to decision 1104 to ensure the volume is in an appropriate range. When the volume property of the detected audio is above or below certain thresholds, the command generator 502 may send one or more volume down or up commands respectively in step 1105. In step 1106, the command generator 502 may then cause the audio analyzer 503 to analyze an audio signal received after the volume commands were transmitted before looping back to decision 1104. When the audio signal is within the volume thresholds, the process successfully completes.

The monitoring and security system 300 may monitor video events detected from video signals received by video cameras 310. The video analyzer 505 may detect video events based on changes in video signals, such as brightness, color, etc., in similar ways as described for decision 1005. The video camera 310 and/or the video analyzer 505 may detect video events when a brightness, color, or other aspect of a video signal received by a video camera 310 changes by a threshold amount. In this way, for example, a video camera 310 pointed at a television or display device may recognize when the television or display device is turned on (e.g., based on the change in brightness, color, etc. associated with a displayed image). The video analyzer 505 may use classification, image analysis, and/or machine vision techniques to categorize such events based on the video signals, and store the analyzed events in the log 601 according to the process shown at FIG. 10. For example, the video analyzer 505 may detect that lights were turned on or off based on changes in brightness of a video signal recorded by video camera 310. The video analyzer 505 may detect that a television is tuned to a particular network and/or channel based on receiving video signals containing a network logo or other image element associated with a network and/or channel. The video analyzer 505 may detect that a particular program is being displayed based on recognizing images associated with the program (e.g., using a fingerprinting process to compare an image fingerprint to a database of image fingerprints associated with particular programs). Indications of corresponding events (e.g., "light on" or "light off" events, events indicating a particular network, channel, and/or program is being displayed, etc.) may be stored in the logs 601, and the profile generator 504 may further detect groups 602 of events and habits 603 therefrom. The profile generator 504 may map such habits to commands for turning lights on and off, turning a television on and off, tuning to a particular channel, network, or program, and the like according to a command schedule 901 or dynamic events 902. Other monitoring devices that monitor a premises 302 may also be used.

The premises controller 301 may detect an event and/or determine information about an event by requesting information from a server associated with a user entertainment device 306. For example, a server at the local office 103 (e.g., app server 107) may offer an application programming interface (API) for accessing information about set top box 113. Accordingly, the premises controller 301 may request information about an event associated with the set top box 113 and/or a television 307 connected to the set top box 113 by sending an API request to the app server 107. The app server 107 may respond with an indication of a channel, network, and/or program currently tuned by the set top box 113, an on/off status of the set top box 113, and the like. Accordingly, the premises controller 301 may detect events and/or obtain additional information about detected and/or analyzed events by sending a request to a device such as an API server. The information obtained from the device may be stored in the logs 601, and the profile generator 504 may further detect groups 602 of events and habits 603 therefrom. The profile generator 504 may map such habits 603 to commands such as turning a television on and off, tuning to a particular channel, network, or program, and the like, according to a command schedule 901 or dynamic events 902.

The monitoring and security system 300 also monitors home automation events, which may be detected by the automation controller 507. For example, the automation controller 507 may communicate with one or more smart devices such as lights 308 and other smart devices such as smart doorbells, smart locks, smart appliances, etc. The automation controller 507, using home automation protocols or other network connectivity, may regularly poll connected smart devices to detect whether their state has changed, and detect events therefrom. For example, the automation controller 507 may detect an event whenever an appliance is turned on or off and/or otherwise changes state. Properties of an event detected by the automation controller 507 may include an on/off state of the device, a room of the device, an intensity of a light 308, and the like. The smart devices may send notifications of their current state and/or changed state to the automation controller 507.

Furthermore, the command generator 502 and/or automation controller 507 may be configured to send commands to smart devices including lights 308. The command schedule 901 or dynamic events 902 may contain commands based on detected events received from the automation controller 507. When a command is directed to a smart device, the command may be send by the command generator 502, the automation controller 507, and/or some other component of the premises controller 301 or network controller 303.

The premises controller 301 may implement a "welcome" mode after a mode is changed from "away" to "stay" or the monitoring and security system 300 otherwise detects that a user has returned to a premises. According to a "welcome" mode, the premises controller 301 may be configured to continue simulating a user's presence (e.g., using the command schedule 901 and/or dynamic events 902) for a limited time after the monitoring and security system 300 is switched out of an "away" mode. For example, for a five-minute period after switching out of an "away" mode, the premises controller 301 may continue to transmit commands according to a command schedule 901 and/or dynamic events 902, thus activating user entertainment devices 306 and/or other devices for a user who has just returned to the premises. After the expiration of the limited time, the premises controller 301 may continue operating according to the procedures associated with the "stay" mode as described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Aspects of the disclosure have been described in terms of examples. While exemplary systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned examples may be utilized alone or in combination or sub-combination with elements of the other examples. For example, any of the above described systems and methods or parts thereof may be combined with the other methods and systems or parts thereof described above. For example, the steps shown in the figures may be performed in other than the recited order, and one or more steps shown may be optional in accordance with aspects of the disclosure. It will also be appreciated and understood that modifications may be made without departing from the true spirit and scope of the present disclosure. The description is thus to be regarded as illustrative instead of restrictive on the present disclosure.

The invention claimed is:

1. A method comprising:
   detecting, by a computing device and while one or more users are present at a premises, an event pair pattern in which a second event occurs following occurrence of a first event, wherein the second event comprises light or sound;
   detecting the first event while the one or more users are not present at the premises; and
   sending, based on the detection of the first event and the second event not occurring after the detection, one or more commands to cause control of one or more light or sound sources to simulate the second event.

2. The method of claim 1, wherein the detecting the event pair pattern comprises:
   determining the first event as a causal event; and
   determining the second event as a reaction event that occurs based on the causal event.

3. The method of claim 1, wherein:
the first event comprises a doorbell ringing;
the second event comprises a dog barking; and
the sending the one or more commands causes output of sound of the dog barking based on the doorbell ringing.

4. The method of claim 1, further comprising:
detecting, after the sending the one or more commands, light or sound emitted from the one or more sources; and
determining, based on determining that the light or sound emitted from the one or more sources matches the second event, that the one or more commands were successfully executed.

5. The method of claim 1, further comprising:
detecting, after the sending the one or more commands, light or sound emitted from the one or more light or sound sources; and
sending, based on determining that the light or sound emitted from the one or more light or sound sources does not match the second event, one or more second commands.

6. The method of claim 1, wherein the sending the one or more commands comprises instructing an audio output device to output an audio signal recording associated with the second event.

7. A computing device comprising:
one or more processors;
memory storing instructions that, when executed by the one or more processors, configure the computing device to:
detect, while one or more users are present at a premises, an event pair pattern in which a second event occurs following occurrence of a first event, wherein the second event comprises light or sound;
detecting the first event while the one or more users are not present at the premises; and
sending, based on the detection of the first event and the second event not occurring after the detection, one or more commands to cause control of one or more light or sound sources to simulate the second event.

8. The computing device of claim 7, wherein the instructions, when executed by the one or more processors, configure the computing device to detect the event pair pattern by:
determining the first event as a causal event; and
determining the second event as a reaction event that occurs based on the causal event.

9. The computing device of claim 7, wherein:
the first event comprises a doorbell ringing;
the second event comprises a dog barking; and
the instructions, when executed by the one or more processors, configure the computing device to send the one or more commands causes output of sound of the dog barking based on the doorbell ringing.

10. The computing device of claim 7, wherein the instructions, when executed by the one or more processors, further configure the computing device to:
detecting, after the sending the one or more commands, light or sound emitted from the one or more sources; and
determining, based on determining that the light or sound emitted from the one or more sources matches the second event, that the one or more commands were successfully executed.

11. The computing device of claim 7, wherein the instructions, when executed by the one or more processors, further configure the computing device to:
detecting, after the sending the one or more commands, light or sound emitted from the one or more light or sound sources; and
sending, based on determining that the light or sound emitted from the one or more light or sound sources does not match the second event, one or more second commands.

12. The computing device of claim 7, wherein the instructions, when executed by the one or more processors, configure the computing device to send the one or more commands comprises instructing an audio output device to output an audio signal recording associated with the second event.

13. At least one non-transitory computer readable storage medium storing computer readable instructions which, when executed, cause performance of actions comprising:
detecting, while one or more users are present at a premises, an event pair pattern in which a second event occurs following occurrence of a first event, wherein the second event comprises light or sound;
detecting the first event while the one or more users are not present at the premises; and
sending, based on the detection of the first event and the second event not occurring after the detection, one or more commands to cause control of one or more light or sound sources to simulate the second event.

14. The at least one non-transitory computer readable storage medium of claim 13, wherein the instructions, when executed, cause detecting the event pair pattern by cause performance of actions comprising:
determining the first event as a causal event; and
determining the second event as a reaction event that occurs based on the causal event.

15. The at least one non-transitory computer readable storage medium of claim 13, wherein:
the first event comprises a doorbell ringing;
the second event comprises a dog barking; and
the instructions, when executed, cause sending the one or more commands causes output of sound of the dog barking based on the doorbell ringing.

16. The at least one non-transitory computer readable storage medium of claim 13, wherein the instructions, when executed, further cause performance of actions comprising:
detecting, after the sending the one or more commands, light or sound emitted from the one or more sources; and
determining, based on determining that the light or sound emitted from the one or more sources matches the second event, that the one or more commands were successfully executed.

17. The at least one non-transitory computer readable storage medium of claim 13, wherein the instructions, when executed, further cause performance of actions comprising:
detecting, after the sending the one or more commands, light or sound emitted from the one or more light or sound sources; and
sending, based on determining that the light or sound emitted from the one or more light or sound sources does not match the second event, one or more second commands.

* * * * *